(12) United States Patent
Ebihara et al.

(10) Patent No.: US 11,422,299 B1
(45) Date of Patent: Aug. 23, 2022

(54) ELECTRONIC DEVICE INCLUDING MARK PORTION

(71) Applicant: NINTENDO CO., LTD., Kyoto (JP)

(72) Inventors: Kazuki Ebihara, Kyoto (JP); Fumihiko Inoue, Kyoto (JP); Shinji Yamamoto, Kyoto (JP); Hiroki Goto, Kyoto (JP); Noboru Wakitani, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/464,605

(22) Filed: Sep. 1, 2021

(30) Foreign Application Priority Data

May 27, 2021 (JP) .............................. JP2021-089140

(51) Int. Cl.
*F21V 8/00* (2006.01)
*G02F 1/1333* (2006.01)
*G02F 1/13357* (2006.01)

(52) U.S. Cl.
CPC .......... *G02B 6/006* (2013.01); *G02B 6/0055* (2013.01); *G02B 6/0063* (2013.01); *G02B 6/0088* (2013.01); *G02F 1/1336* (2013.01); *G02F 1/133308* (2013.01)

(58) Field of Classification Search
CPC .... G02B 6/006; G02B 6/0063; G09F 13/0448

USPC .................................. 362/23.13, 23.14, 606
See application file for complete search history.

(56) References Cited

U.S. PATENT DOCUMENTS

| | | | |
|---|---|---|---|
| 2006/0203516 A1* | 9/2006 | Watanabe | G02B 6/0063 362/615 |
| 2008/0266769 A1* | 10/2008 | Massaro | G06F 1/1637 361/679.55 |
| 2009/0056183 A1 | 5/2009 | Reiland et al. | |
| 2016/0041329 A1 | 2/2016 | Lin | |
| 2016/0209569 A1* | 7/2016 | Cho | G02B 6/0076 |

FOREIGN PATENT DOCUMENTS

JP 2012-068431 4/2012

\* cited by examiner

*Primary Examiner* — Keith G. Delahoussaye
(74) *Attorney, Agent, or Firm* — Nixon & Vanderhye PC

(57) ABSTRACT

An electronic device includes a housing, a display, a light source, a light guide plate, and a mark portion. The light source is provided inside the housing and below the display. The mark portion is provided in the rear surface of the housing and includes a portion that shines as light from the light source passes therethrough. A lower end of the mark portion is defined as a first end and an upper end of the mark portion is defined as a second end. When viewed in a direction from the rear surface toward the front surface, the light source is located between the first end and the second end, and a distance from the second end to the light source is longer than a distance from the first end to the light source.

16 Claims, 16 Drawing Sheets

ELECTRONIC DEVICE INCLUDING MARK PORTION

This nonprovisional application is based on Japanese Patent Application No. 2021-089140 filed with the Japan Patent Office on May 27, 2021, the entire contents of which are hereby incorporated by reference.

FIELD

The present disclosure relates to an electronic device.

BACKGROUND AND SUMMARY

A liquid crystal display including a backlight unit has been known.

An exemplary embodiment provides an electronic device that includes a housing, a display, a light source, a light guide plate, and a mark portion. The housing includes a front surface and a rear surface opposite to the front surface. The display is provided on a side of the front surface of the housing, and includes a first side on a lower side and a second side on an upper side. The light source is provided inside the housing and on the lower side. The light guide plate is provided between the display and the rear surface, and illuminates the display by guiding light from the light source to the upper side from the lower side of the display. The mark portion is provided in the rear surface of the housing and includes a portion that shines as light from the light source passes therethrough. A lower end of the mark portion is defined as a first end and an upper end of the mark portion is defined as a second end. When viewed in a direction from the rear surface toward the front surface, the light source is located between the first end and the second end and a distance from the second end to the light source is longer than a distance from the first end to the light source.

The light guide plate is irradiated with light from the light source. As the light guide plate is irradiated with light from the light source, a luminance distribution of the light source when viewed in the direction from the rear surface toward the front surface spreads on a side of the light guide plate. Therefore, as the mark portion is provided such that the center of the mark portion coincides with the center of the light source, the mark portion may not uniformly shine.

According to the electronic device in the present disclosure, when viewed in the direction from the rear surface toward the front surface, the light source is located between the first end and the second end and the distance from the second end to the light source is longer than the distance from the first end to the light source. The center of the luminance distribution that spreads on the side of the light guide plate can thus be brought closer to the center of the mark portion. Therefore, the mark portion can uniformly shine.

The electronic device may further include a reflector plate located between each of the light source and the light guide plate and the rear surface and a light shield located between the reflector plate and the mark portion, the light shield cutting off light from the light source.

According to this construction, light from the light source can be suppressed by the light shield. Therefore, locally too high brightness of the mark portion can be suppressed. Consequently, the mark portion can uniformly shine.

The electronic device may further include a light shield located between the light source and the rear surface when viewed in the direction from the rear surface toward the front surface, the light shield cutting off light from the light source. The mark portion may include a central portion and a peripheral portion that is provided around the central portion and shines as light from the light source passes therethrough. The light shield may be provided between the central portion and the light source and not provided between the peripheral portion and the light source.

According to this construction, light from the light source can be suppressed by the light shield. Therefore, locally too high brightness of a region in the peripheral portion close to the central portion can be suppressed. Consequently, the peripheral portion of the mark portion can uniformly shine.

In the electronic device, the light shield may be constructed to reflect light from the light source and to guide light to the peripheral portion.

According to this construction, as the light shield guides light from the light source to the peripheral portion, the peripheral portion as a whole can be bright. Consequently, the peripheral portion of the mark portion can more uniformly shine.

In the electronic device, the light shield may protrude toward the light source. A distance between the light source and the light shield at a position of the light source may be shorter than a distance between the light source and the light shield at a position of a boundary between the central portion and the peripheral portion.

According to this construction, light in a region close to the light source can more positively be cut off than light in a region far from the light source. Therefore, too bright light around the light source can be cut off. Consequently, the peripheral portion of the mark portion can uniformly shine.

In the electronic device, as the light shield is closer to the light source in a direction from the first side toward the second side, the light shield may protrude toward the light source.

According to this construction, light in a region close to the light source can more positively be cut off. Therefore, too bright light around the light source can be cut off. Consequently, the peripheral portion of the mark portion can uniformly shine.

In the electronic device, the light shield may be higher in reflectance than the housing.

According to this construction, light imperviousness of the light shield can be enhanced. Therefore, too bright light around the light source can further be cut off. Consequently, the peripheral portion of the mark portion can uniformly shine.

In the electronic device, the peripheral portion may include a plurality of light transmissive portions distant from one another. When viewed in the direction from the rear surface toward the front surface, the plurality of light transmissive portions may be provided such that the central portion lies among the light transmissive portions or the central portion is surrounded by the light transmissive portions.

According to this construction, the plurality of light transmissive portions provided such that the central portion lies among the light transmissive portions or the central portion is surrounded by the light transmissive portions can uniformly shine.

In the electronic device, when viewed in the direction from the rear surface toward the front surface, the peripheral portion may be provided to surround the central portion.

According to this construction, the peripheral portion provided to surround the central portion can uniformly shine.

In the electronic device, when viewed in the direction from the rear surface toward the front surface, the light source may be provided on a perpendicular bisector of the first side. When viewed in the direction from the rear surface toward the front surface, the mark portion may be in a shape in line symmetry with respect to the perpendicular bisector.

The electronic device may further include a rib that is provided around the light shield and guides light from the light source to the peripheral portion.

The electronic device may include a battery holder where a battery is accommodated, the battery holder being provided between the rear surface and the light guide plate. The rib may be provided in a portion of the battery holder different from a portion where the battery is arranged. The rib and the portion where the battery is arranged may be provided on an identical surface of the battery holder.

According to this construction, as the rib is a part of the battery holder, a space can be saved and the number of components can be reduced.

In the electronic device, when viewed in the direction from the rear surface toward the front surface, in the peripheral portion, the rib may be closer to the central portion.

In the electronic device, the mark portion may include a central portion and a peripheral portion that is provided around the central portion and shines as light from the light source passes therethrough. The central portion may be higher in light imperviousness than the peripheral portion.

According to this construction, the central portion can suppress light from the light source. Therefore, locally too high brightness of a region in the peripheral portion close to the central portion can be suppressed. Consequently, the peripheral portion of the mark portion can uniformly shine.

In the electronic device, the housing may include a rear housing portion that defines the rear surface. The rear housing portion may include a first member that defines the mark portion and a second member contiguous to the first member and increasing in thickness as a distance from the first member increases. At least a part including an outer edge of the mark portion may be mirror-finished. When viewed in the direction from the rear surface toward the front surface, a boundary between the first member and the second member may surround an outer edge of the mirror-finished mark portion.

The electronic device may include a flexible printed circuit electrically connected to the display. The flexible printed circuit may be connected to a central position of the first side and folded back at a position other than the central position of the first side.

According to this construction, the flexible printed circuit can be prevented from cutting off light from the light source.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
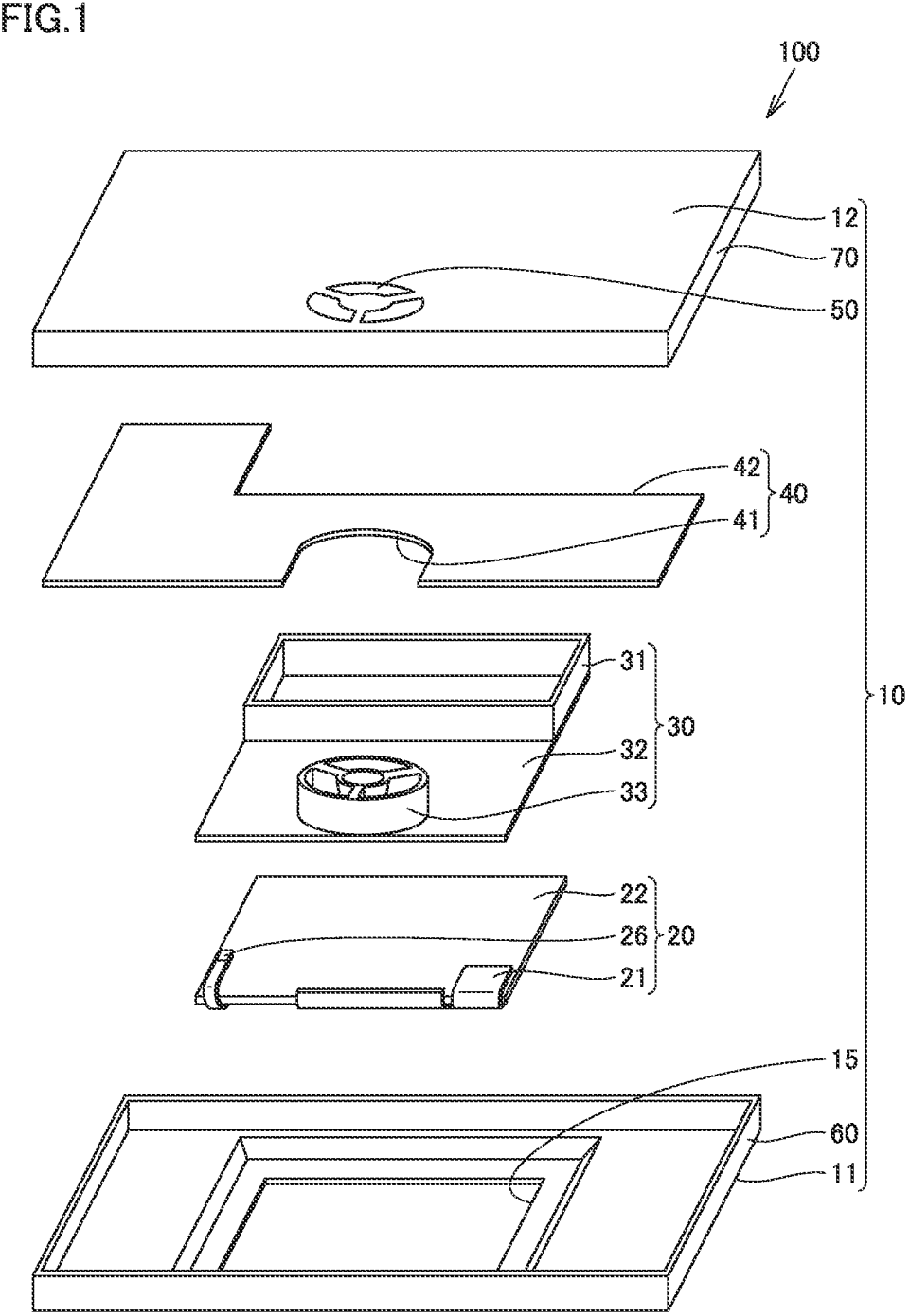
FIG. 1 shows an exemplary illustrative non-limiting exploded schematic perspective view illustrating a construction of an electronic device according to the present embodiment.

An embodiment of the present disclosure (which will also be referred to as the present embodiment below) will be described in detail with reference to the drawings. The same or corresponding elements in the drawings have the same reference characters allotted and description thereof will not be repeated.

[A. Electronic Device]

Overview of a construction of an electronic device 100 according to the present embodiment will initially be described.

FIG. 1 is an exploded schematic perspective view illustrating a construction of electronic device 100 according to the present embodiment. As shown in FIG. 1, electronic device 100 according to the present embodiment mainly includes a housing 10, a substrate 40, a battery holder 30, and a liquid crystal display unit 20. Housing 10 includes a front housing portion 60, a rear housing portion 70, and a mark portion 50. Front housing portion 60 forms a front surface 11 of housing 10. An opening 15 is provided in front housing portion 60.

Rear housing portion 70 forms a rear surface 12 of housing 10. Rear surface 12 is located opposite to front surface 11. Mark portion 50 is provided in rear housing portion 70. Battery holder 30 includes a base 32, a battery accommodation portion 31, and an optical path formation portion 33. Each of battery accommodation portion 31 and optical path formation portion 33 is provided in base 32. Optical path formation portion 33 is distant from battery accommodation portion 31. Substrate 40 includes a first notch 41 and a second notch 42. First notch 41 is positioned around optical path formation portion 33. Second notch 42 is positioned around battery holder 30.

Liquid crystal display unit 20 is provided between front housing portion 60 and battery holder 30. Battery holder 30 is provided between substrate 40 and liquid crystal display unit 20. Substrate 40 is provided between battery holder 30 and rear housing portion 70.

Figure 2:
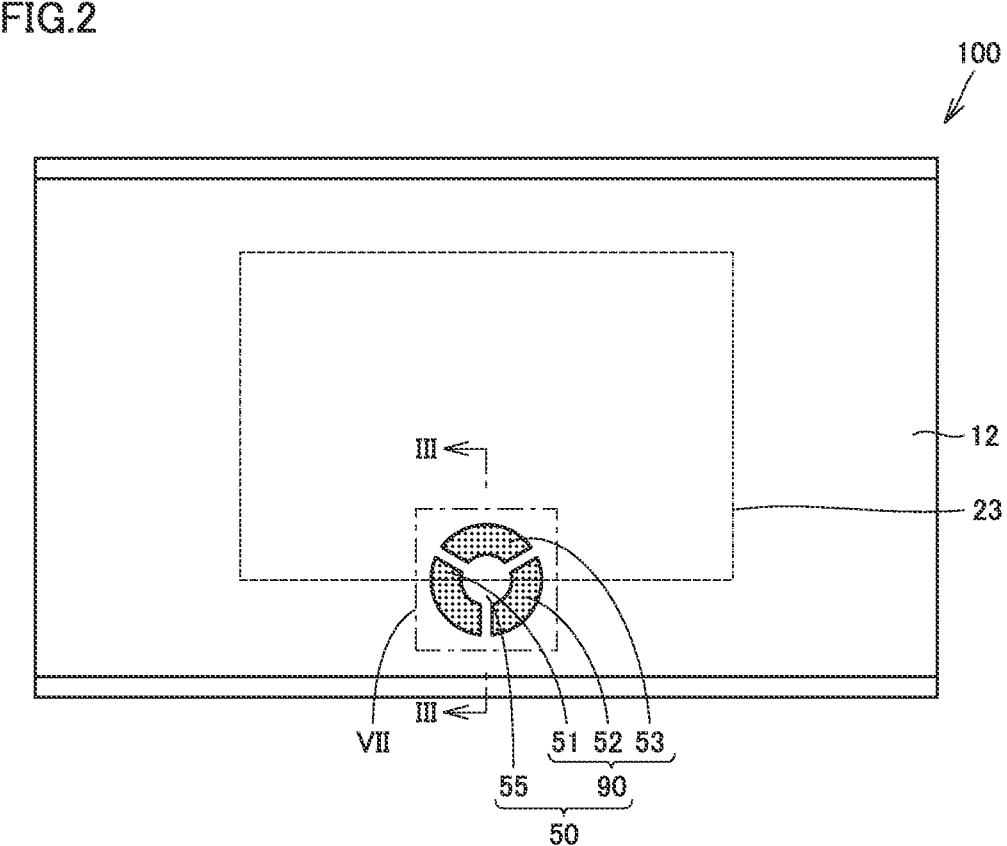
FIG. 2 shows an exemplary illustrative non-limiting schematic plan view illustrating the construction of the electronic device according to the present embodiment.

FIG. 2 is a schematic plan view illustrating the construction of electronic device 100 according to the present embodiment. The schematic plan view shown in FIG. 2 shows a state that housing 10, substrate 40, battery holder 30, and liquid crystal display unit 20 shown in FIG. 1 are assembled. Mark portion 50 is provided in rear surface 12 of housing 10. A display 23 of liquid crystal display unit 20 is provided on a side of front surface 11 of housing 10. As shown in FIG. 2, when viewed in the direction from rear surface 12 toward front surface 11, at least a part of mark portion 50 may be superimposed on display 23.

As shown in FIG. 2, rear surface 12 of rear housing portion 70 may be in a rectangular shape. Mark portion 50 may be located in the center in a direction of a long side of rear surface 12. Mark portion 50 may be located on a side of any long side relative to the central position in a direction of a short side of rear surface 12. Mark portion 50 may be constituted of a central portion 55 and a peripheral portion 90. Central portion 55 is a portion that does not shine. Peripheral portion 90 is provided around central portion 55. Peripheral portion 90 is a portion that shines as light from a light source 5 passes therethrough. Peripheral portion 90 may visually be recognizable even when the light source is not turned on. Peripheral portion 90 may be distinguishable from central portion 55 by touching. Peripheral portion 90 and central portion 55 are in a shape that allows a user to recognize that the peripheral portion and the central portion as a whole constitute a mark.

Peripheral portion 90 includes, for example, a plurality of light transmissive portions. Specifically, peripheral portion 90 includes a first light transmissive portion 51, a second light transmissive portion 52, and a third light transmissive portion 53. Mark portion 50 includes a portion that shines as light from light source 5 passes therethrough. Each of first light transmissive portion 51, second light transmissive portion 52, and third light transmissive portion 53 is a portion that shines as light from light source 5 passes therethrough. In contrast, central portion 55 is a portion where light from light source 5 is cut off. Central portion 55 is darker than each of the plurality of light transmissive portions.

Figure 3:
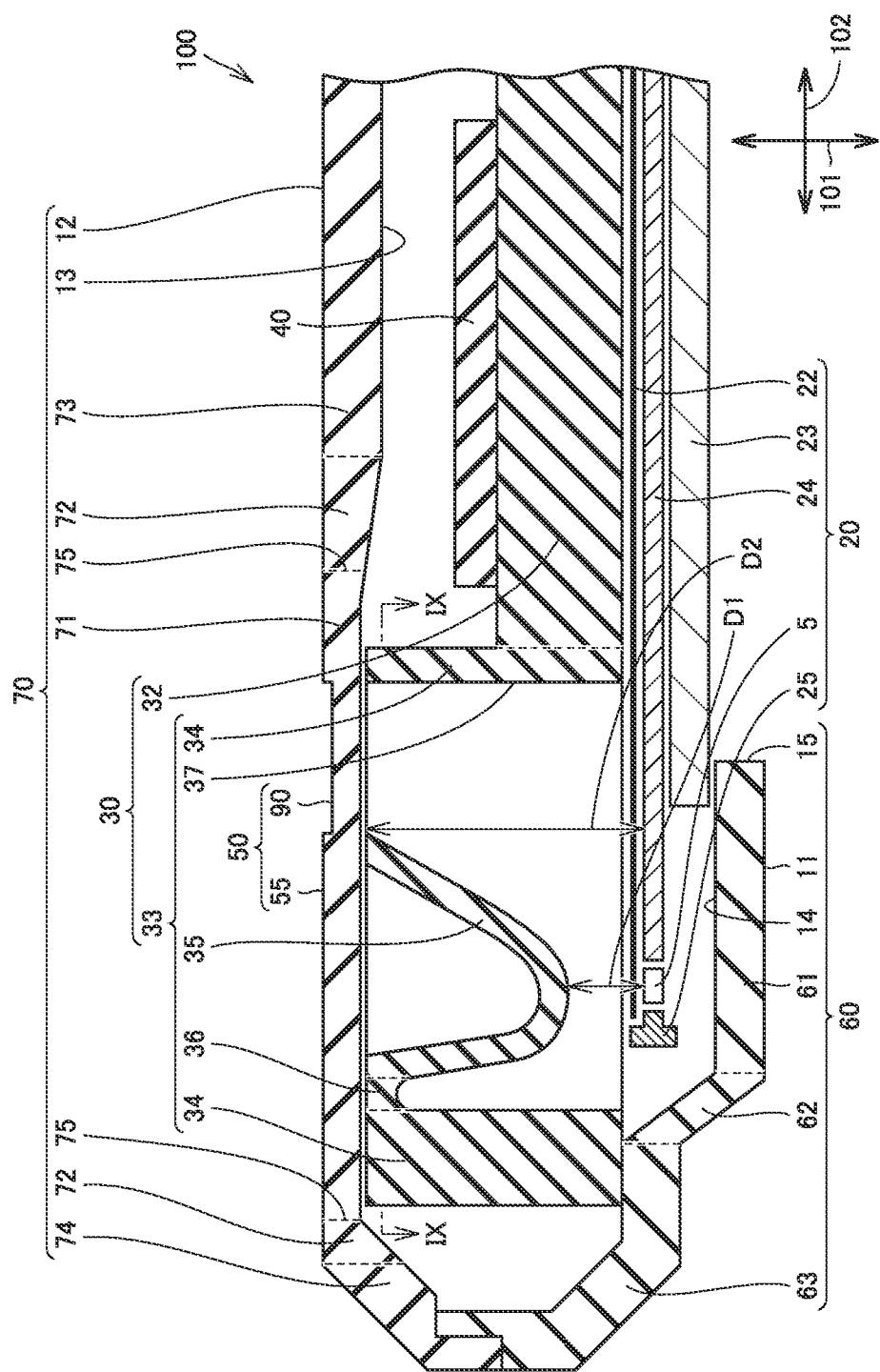
FIG. 3 shows an exemplary illustrative non-limiting schematic vertical cross-sectional view along the line III-III in FIG. 2.

FIG. 3 is a schematic vertical cross-sectional view along the line III-III in FIG. 2. As shown in FIG. 3, liquid crystal display unit 20, substrate 40, and battery holder 30 are provided inside housing 10. Liquid crystal display unit 20 mainly includes display 23, light source 5, a light guide plate 24, a reflector plate 22, and a frame 25. A direction in parallel to a direction from rear surface 12 toward front surface 11 (that is, a front/rear direction) is herein defined as a first direction 101. As will be described later, a direction in parallel to a direction from a first side 1 toward a second side 2 (that is, an upward/downward direction) is defined as a second direction 102. Second direction 102 is perpendicular to first direction 101.

Display 23 is provided on a side of front surface 11 of housing 10. In first direction 101, display 23 may be located between front surface 11 and light guide plate 24. Light guide plate 24 functions as a backlight of display 23. In first direction 101, light guide plate 24 is provided between display 23 and rear surface 12. More specifically, in first direction 101, light guide plate 24 is located between display 23 and reflector plate 22. When viewed in first direction 101, light guide plate 24 is superimposed on display 23. Though display 23 is, for example, a liquid crystal display, it is not limited to the liquid crystal display.

Reflector plate 22 is located between each of light source 5 and light guide plate 24 and rear surface 12. Reflector plate 22 reflects light from light source 5 or light that leaks from light guide plate 24 toward display 23. Some of light from light source 5 or some of light that leaks from light guide plate 24, however, passes through reflector plate 22. Light that passes through reflector plate 22 illuminates mark portion 50. In first direction 101, reflector plate 22 is located between battery holder 30 and light guide plate 24. When viewed in first direction 101, reflector plate 22 is superimposed on light guide plate 24.

Light source 5 is provided inside housing 10. Light source 5 is opposed to light guide plate 24. Light source 5 irradiates light guide plate 24 with light. Light source 5 is implemented, for example, by a light emitting diode. Light emitted from light source 5 includes visible light. In second direction 102, light source 5 is distant from light guide plate 24. In second direction 102, light source 5 and light guide plate 24 are superimposed on each other. From a different point of view, in first direction 101, light source 5 and light guide plate 24 are flush with each other. When viewed in first direction 101, reflector plate 22 may cover light source 5.

Frame 25 may surround light guide plate 24. From a different point of view, light guide plate 24 may be provided inside frame 25. Frame 25 may surround reflector plate 22. From a different point of view, reflector plate 22 may be provided inside frame 25. Light source 5 may be located between light guide plate 24 and frame 25.

Battery holder 30 is provided between rear surface 12 of housing 10 and light guide plate 24. Optical path formation portion 33 may be a part of battery holder 30 or a component different from battery holder 30. Optical path formation portion 33 includes a light shield 35, a rib 34, and a connector 36. Light shield 35 is located between light source 5 and rear surface 12 of housing 10. Specifically, light shield 35 is provided between central portion 55 of mark portion 50 and light source 5. Light shield 35 is located between reflector plate 22 and mark portion 50. Light shield 35 cuts off some of light from light source 5 that passes through reflector plate 22 or some of light from light guide plate 24. Light shield 35 does not have to be provided between peripheral portion 90 and light source 5. Rib 34 is provided around light shield 35. Connector 36 connects rib 34 and light shield 35 to each other.

As shown in FIG. 3, light shield 35 may protrude toward light source 5. A distance (a third distance D1) between light source 5 and light shield 35 at the position of light source 5 may be shorter than a distance (a fourth distance D2) between light source 5 and light shield 35 at a position of a boundary between central portion 55 and peripheral portion 90. The distance between light source 5 and light shield 35 is a distance in first direction 101. As light shield 35 is more distant from light source 5 in second direction 102, the distance between light source 5 and light shield 35 in first direction 101 may be longer. From a different point of view, as light shield 35 is closer to light source 5 in second direction 102, light shield 35 may protrude toward light source 5. At the position of light source 5, the distance between light source 5 and light shield 35 may be shortest.

Though a lower limit of a value calculated by dividing third distance D1 by fourth distance D2 is not particularly limited, it may be, for example, not smaller than 0.1 or not smaller than 0.2. Though an upper limit of the value calculated by dividing third distance D1 by fourth distance D2 is not particularly limited, it may be, for example, not larger than 0.8, not larger than 0.6, or not larger than 0.3.

Rear housing portion 70 includes a first member 71, a second member 72, a third member 73, and a first sidewall member 74. First member 71 forms mark portion 50. Second member 72 is contiguous to first member 71. Second member 72 increases in thickness as the distance from first member 71 increases. As shown in FIG. 3, in second direction 102, second member 72 is located on each of opposing sides of first member 71. Third member 73 may be contiguous to second member 72. Third member 73 may be located opposite to first member 71, with respect to second member 72. Second member 72 may be located between first member 71 and third member 73. Third member 73 is larger in thickness than first member 71. First sidewall member 74 may be contiguous to second member 72. Second member 72 may be located between first sidewall member 74 and first member 71.

At least a part including an outer edge of mark portion 50 may be mirror-finished. Specifically, peripheral portion 90 may be mirror-finished. Peripheral portion 90 may be recessed. Central portion 55 does not have to be mirror-finished. In rear surface 12 of rear housing portion 70, a region other than peripheral portion 90 does not have to be mirror-finished. The region not mirror-finished may be grained. The grained region tends to diffuse light. The mirror-finished region is less likely to diffuse light. From a different point of view, peripheral portion 90 may be lower in diffusivity of light than the region other than peripheral portion 90 in rear surface 12 of rear housing portion 70.

Front housing portion 60 includes a fourth member 61, a fifth member 62, and a second sidewall member 63. Fourth member 61 forms front surface 11. Fifth member 62 is contiguous to fourth member 61. Second sidewall member 63 is contiguous to fifth member 62. In second direction 102, fifth member 62 is located between fourth member 61 and second sidewall member 63. Second sidewall member 63 is combined with first sidewall member 74. Opening 15 is provided in fourth member 61. Display 23 is exposed through opening 15. Display 23 is visually recognized from the outside through opening 15.

[B. Liquid Crystal Display Unit]

Figure 4:
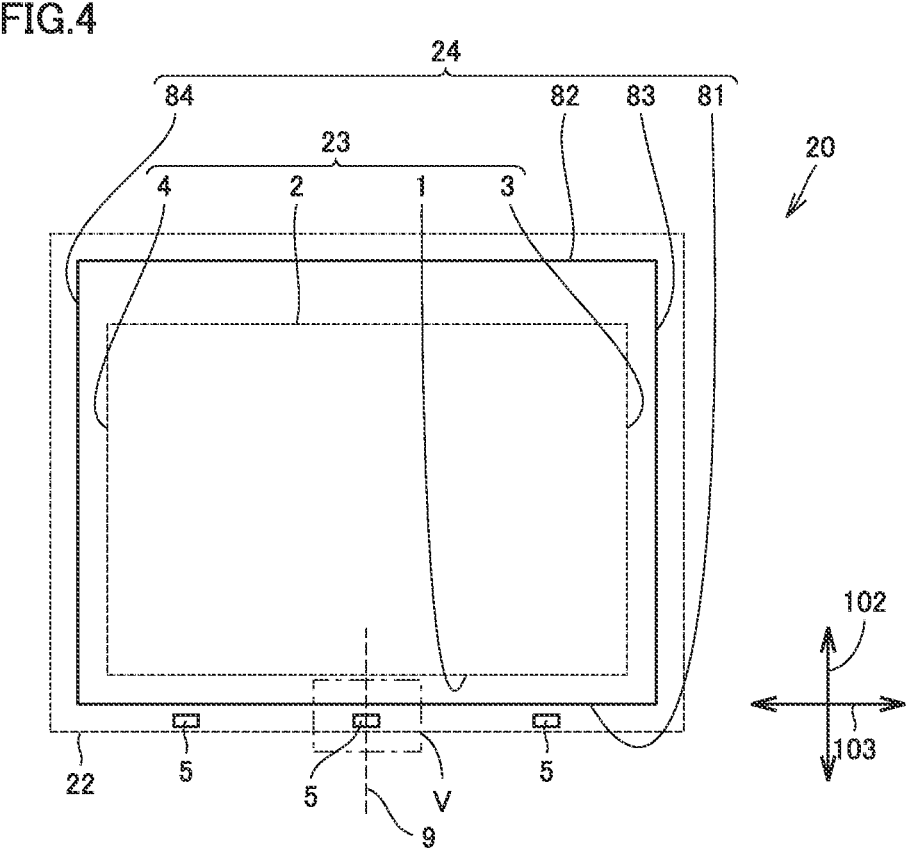
FIG. 4 shows an exemplary illustrative non-limiting schematic plan view illustrating a construction of a liquid crystal display unit.

FIG. 4 is a schematic plan view illustrating a construction of liquid crystal display unit 20. As shown in FIG. 4, when viewed in first direction 101, display 23 may be in a substantially rectangular shape. When viewed in first direction 101, display 23 includes, for example, first side 1, second side 2, a third side 3, and a fourth side 4. First side 1 is located opposite to second side 2. Third side 3 is located opposite to fourth side 4. Each of first side 1 and second side 2 is, for example, a long side of a rectangle. Each of third side 3 and fourth side 4 is, for example, a short side of the rectangle.

As shown in FIG. 4, the direction in parallel to the direction from first side 1 toward second side 2 (that is, the upward/downward direction) is defined as second direction 102. A direction from first side 1 toward second side 2 is defined as an upward direction. A direction from second side 2 toward first side 1 is defined as a downward direction. A direction in parallel to a direction from fourth side 4 toward third side 3 (that is, a lateral direction) is defined as a third direction 103. A direction from fourth side 4 toward third side 3 is defined as a right direction. A direction from third side 3 toward fourth side 4 is defined as a left direction. Third direction 103 is orthogonal to second direction 102. First direction 101 is orthogonal to each of second direction 102 and third direction 103.

As shown in FIG. 4, light source 5 is provided below display 23. Light source 5 is located around the center of first side 1. When viewed in first direction 101, light source 5 may be located on a perpendicular bisector 9 of first side 1. For example, three light sources 5 are provided, although the number of light sources is not particularly limited. When viewed in first direction 101, three light sources 5 may be located on a straight line in parallel to first side 1. When viewed in first direction 101, light source 5 may be located on an outer side of an outer peripheral edge of display 23. When viewed in first direction 101, a part or the entirety of light source 5 may be superimposed on display 23. When viewed in first direction 101, reflector plate 22 may be superimposed on the entire surface of light guide plate 24.

Light guide plate 24 illuminates display 23 by guiding light from light source 5 upward from below display 23. When viewed in first direction 101, light guide plate 24 may be in a substantially rectangular shape. Light guide plate 24 includes a first end surface 81, a second end surface 82, a third end surface 83, and a fourth end surface 84. Second end surface 82 is located opposite to first end surface 81. Third end surface 83 is located opposite to fourth end surface 84. A direction from first end surface 81 toward second end surface 82 may be the same as second direction 102. A direction from fourth end surface 84 toward third end surface 83 may be the same as third direction 103.

As shown in FIG. 4, light source 5 is opposed to first end surface 81. Light source 5 is distant from first end surface 81. In second direction 102, first end surface 81 is located between light source 5 and second end surface 82. In second direction 102, first end surface 81 may be located between first side 1 and light source 5. In third direction 103, light source 5 is located between third end surface 83 and fourth end surface 84.

Figure 5:
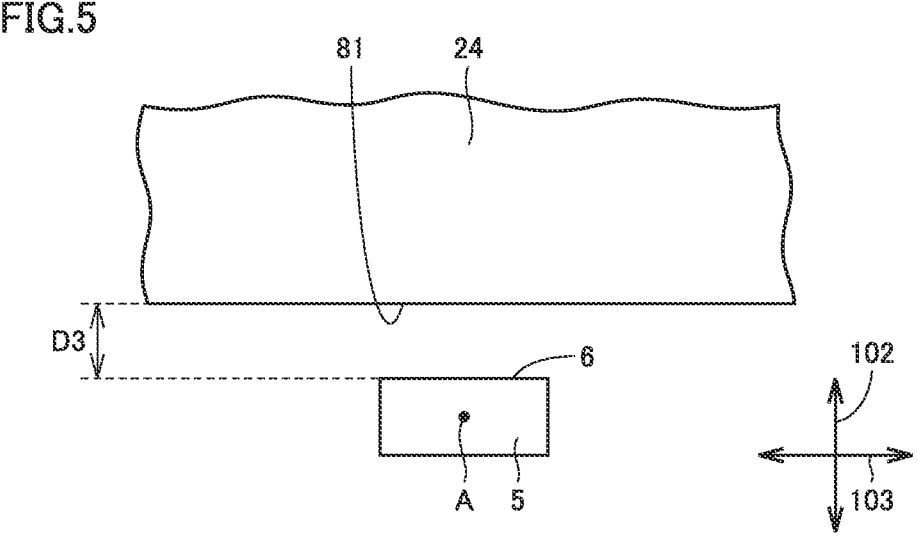
FIG. 5 shows an exemplary illustrative non-limiting enlarged plan view of a region V in FIG. 4.

FIG. 5 is an enlarged plan view of a region V in FIG. 4. As shown in FIG. 5, light source 5 includes a light emitting surface 6. Light emitting surface 6 is opposed to first end surface 81 of light guide plate 24. Light source 5 emits light from light emitting surface 6 toward first end surface 81. When viewed in first direction 101, light source 5 may be in a rectangular shape. A length of light source 5 in third direction 103 may be longer than a length of light source 5 in second direction 102. Light emitting surface 6 may be distant from or in contact with first end surface 81. When light emitting surface 6 is distant from first end surface 81, a distance (a fifth distance D3) between light emitting surface 6 and first end surface 81 in second direction 102 may be, for example, not shorter than 0.01 mm and not longer than 0.20 mm. When viewed in first direction 101, the center (a first center A) of light source 5 is a central position of light source 5 in second direction 102 and a central position of light source 5 in third direction 103.

[C. Luminance Distribution]

Figure 6:
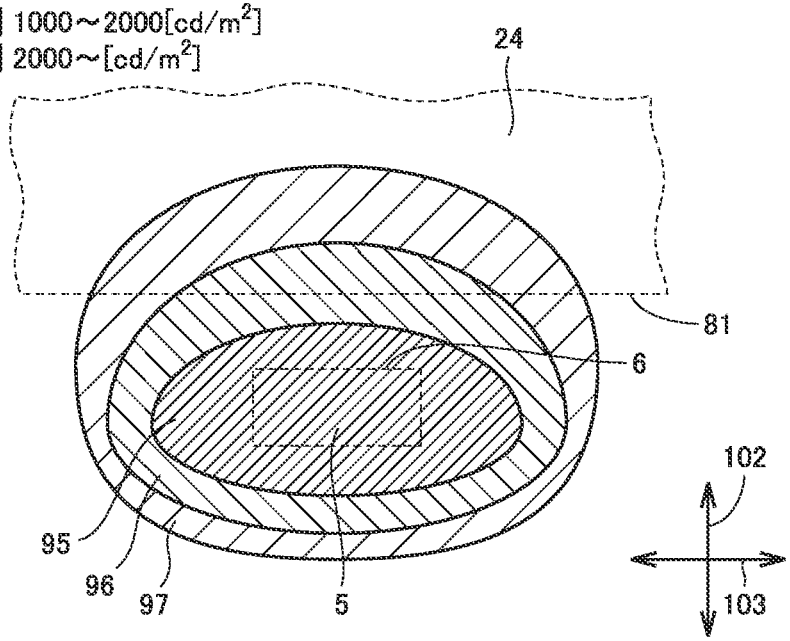
FIG. 6 shows an exemplary illustrative non-limiting schematic diagram illustrating a luminance distribution around a light source.

FIG. 6 is a schematic diagram illustrating a luminance distribution around the light source. In FIG. 6, a first luminance region 95 is a region having a luminance exceeding 2000 cd/m². A second luminance region 96 is a region having a luminance exceeding 1000 cd/m² and not higher than 2000 cd/m². A third luminance region 97 is a region having a luminance exceeding 500 cd/m² and not higher than 1000 cd/m².

As shown in FIG. 6, the region high in luminance is widely distributed in a direction from light emitting surface 6 toward light guide plate 24. Such a distribution may be derived, for example, from reflection of some of light from light emitting surface 6 at first end surface 81 of light guide plate 24. Alternatively, for example, light guided into light guide plate 24 may pass through from light guide plate 24 toward rear surface 12. In second direction 102, the luminance distribution is asymmetric with respect to light source 5. In third direction 103, the luminance distribution may be symmetrical with respect to light source 5.

[D. Mark Portion]

Figure 7:
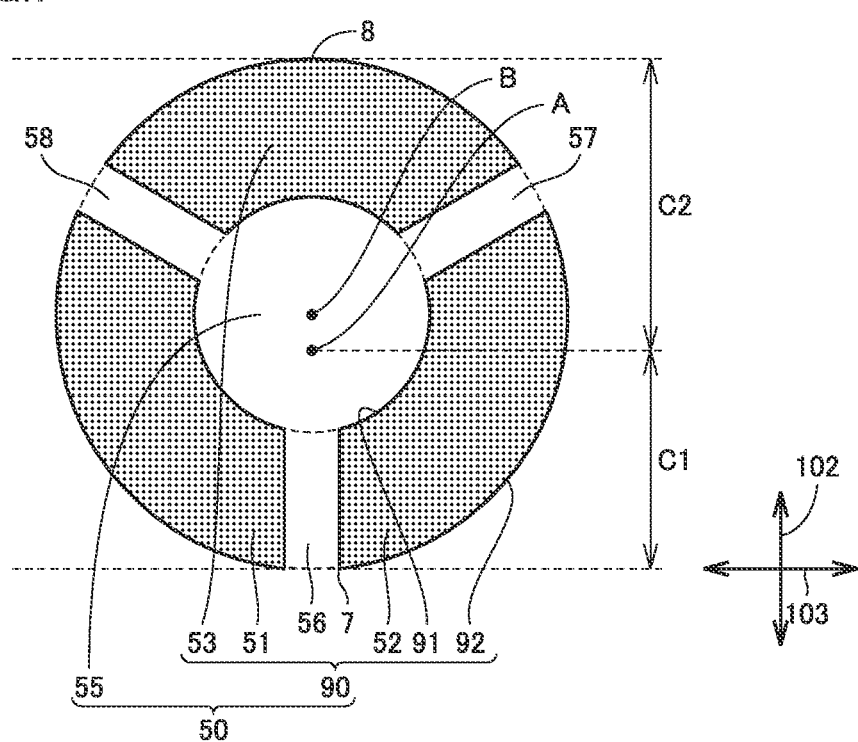
FIG. 7 shows an exemplary illustrative non-limiting schematic plan view illustrating a construction of a mark portion.

FIG. 7 is a schematic plan view illustrating a construction of mark portion 50. In second direction 102, the center (first center A) of light source 5 is located below a center (a second center B) of mark portion 50. When viewed in first direction 101, the center (second center B) of mark portion 50 is the central position of mark portion 50 in second direction 102 and the central position of mark portion 50 in third direction 103. The central position of mark portion 50 in second direction 102 is intermediate between a portion where mark portion 50 shines at a lowermost side and a portion where mark portion 50 shines at an uppermost side. The central position of mark portion 50 in third direction 103 is intermediate between a portion where mark portion 50 shines on a rightmost side and a portion where mark portion 50 shines on a leftmost side. When viewed in first direction 101, mark portion 50 may be in a shape in line symmetry with respect to perpendicular bisector 9 (see FIG. 4) of first side 1. When viewed in first direction 101, perpendicular bisector 9 of first side 1 may pass through each of first center A and second center B.

A lower end of mark portion 50 is defined as a first end 7. An upper end of mark portion 50 is defined as a second end 8. When viewed in first direction 101, light source 5 is located between first end 7 and second end 8. When viewed in first direction 101, a distance (a second distance C2) from second end 8 to light source 5 is longer than a distance (a first distance C1) from first end 7 to light source 5.

Though a lower limit of a value calculated by dividing second distance C2 by first distance C1 is not particularly limited, it may be, for example, not smaller than 1.1 or not smaller than 1.2. Though an upper limit of the value calculated by dividing second distance C2 by first distance C1 is not particularly limited, it may be, for example, not larger than 2 or not larger than 1.8.

As shown in FIG. 7, peripheral portion 90 may include a plurality of light transmissive portions. The plurality of light transmissive portions are distant from one another. The plurality of light transmissive portions include, for example, first light transmissive portion 51, second light transmissive portion 52, and third light transmissive portion 53. When viewed in first direction 101, the plurality of light transmissive portions may be provided such that central portion 55 lies thereamong or they surround central portion 55. Each of the plurality of light transmissive portions may be mirror-finished. Each of the plurality of light transmissive portions may be recessed relative to central portion 55.

A plurality of light shield regions may be formed in rear surface 12. The plurality of light shield regions include, for example, a first light shield region 56, a second light shield region 57, and a third light shield region 58. First light shield region 56, second light shield region 57, and third light shield region 58 may radially extend from central portion 55. First light shield region 56 is located between first light transmissive portion 51 and second light transmissive portion 52. Second light shield region 57 is located between second light transmissive portion 52 and third light transmissive portion 53. Third light shield region 58 is located between third light transmissive portion 53 and first light transmissive portion 51. Each of the plurality of light shield regions does not have to be mirror-finished. Each of the plurality of light shield regions may be grained.

[E. Battery Holder]

Figure 8:
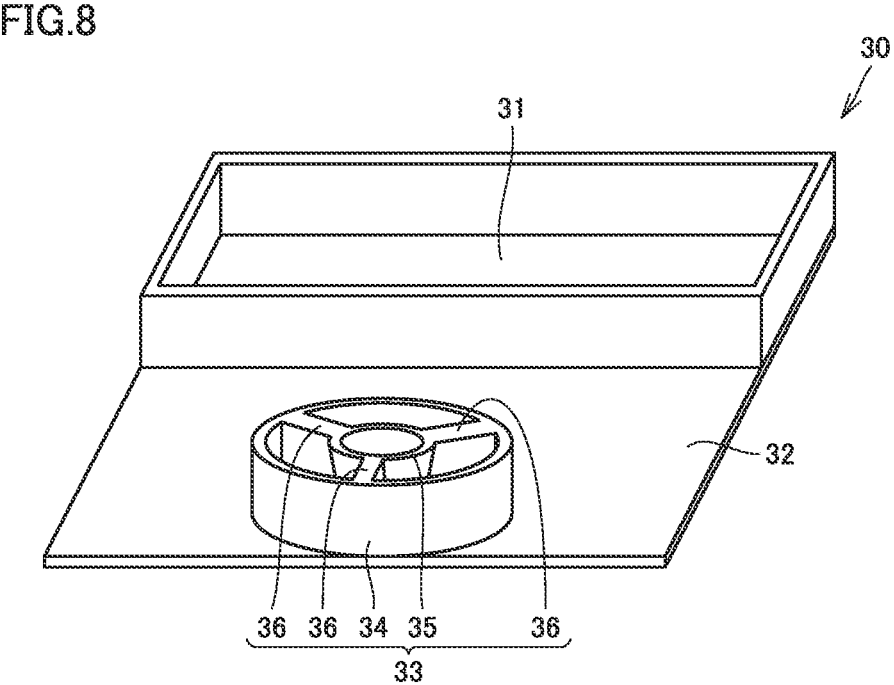
FIG. 8 shows an exemplary illustrative non-limiting schematic perspective view illustrating a construction of a battery holder.

FIG. 8 is a schematic perspective view illustrating a construction of battery holder 30. As shown in FIG. 8, battery holder 30 includes battery accommodation portion 31, optical path formation portion 33, and base 32. A battery (not shown) is accommodated in battery accommodation portion 31. Battery accommodation portion 31 is provided in base 32. Optical path formation portion 33 may be provided in base 32. Optical path formation portion 33 is constituted, for example, of rib 34, light shield 35, and connector 36. Rib 34 may be provided in a portion of battery holder 30 different from battery accommodation portion 31. Rib 34 may be distant from battery accommodation portion 31. Rib 34 and battery accommodation portion 31 may be provided on the same surface of battery holder 30.

Light shield 35 which is a part of battery holder 30 may be higher in reflectance than housing 10. A material for light shield 35 is, for example, an acrylonitrile butadiene styrene (ABS) resin to which a material that enhances reflectance has been added. An exemplary material that enhances reflectance is an anti-ultraviolet (UV) agent. An exemplary material for housing 10 is an ABS resin to which no anti-UV agent has been added. The material for light shield 35 may be identical to or different from the material for each of battery accommodation portion 31 and base 32.

Figure 9:
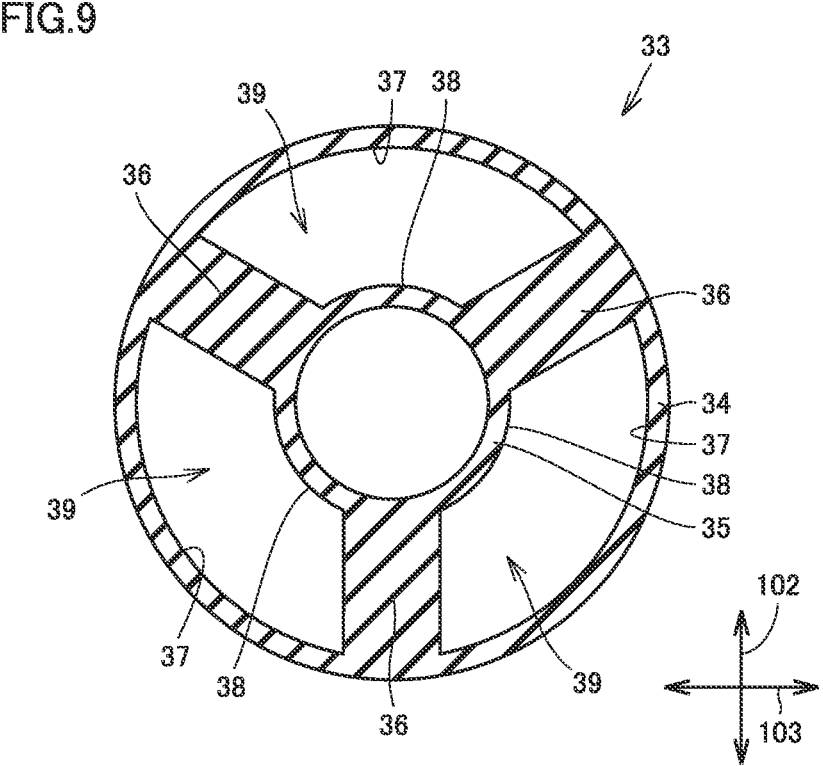
FIG. 9 shows an exemplary illustrative non-limiting schematic lateral cross-sectional view along the line IX-IX in FIG. 3.

FIG. 9 is a schematic lateral cross-sectional view along the line IX-IX in FIG. 3. As shown in FIG. 3, rib 34 is, for example, a cylindrical member. Rib 34 surrounds light shield 35. Connector 36 extends radially from light shield 35. When viewed in first direction 101, connector 36 is arranged at positions, for example, at 0°, 120°, and 240°. A light guide path 39 is defined by an outer circumferential surface 38 of light shield 35, an inner circumferential surface 37 of rib 34, and two connectors 36. Light from light source 5 passes through light guide path 39 and passes through the plurality of light transmissive portions.

Figure 10:
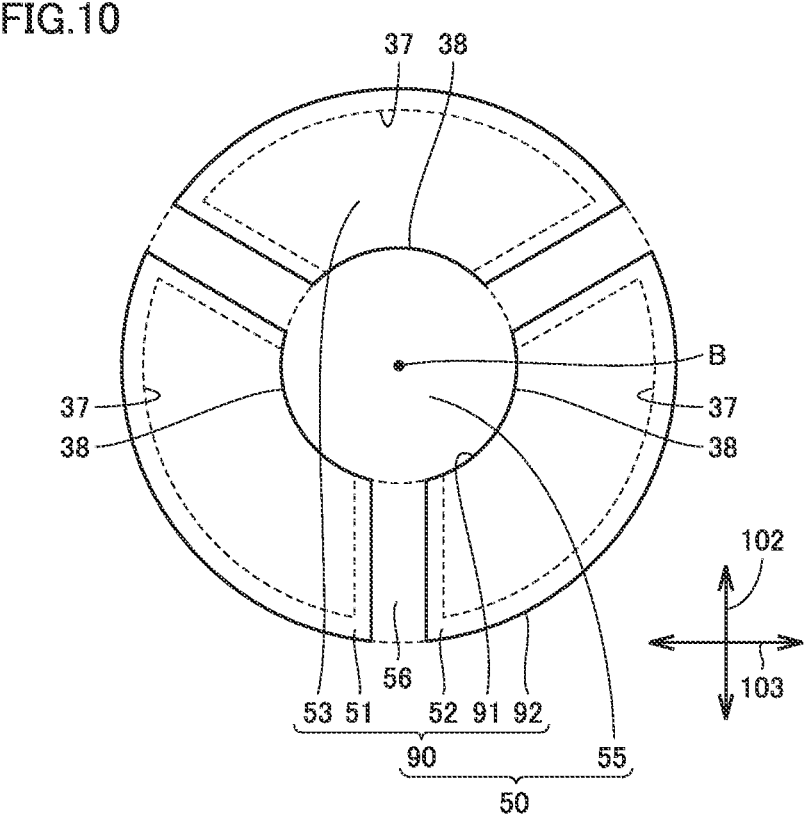
FIG. 10 shows an exemplary illustrative non-limiting schematic plan view illustrating positional relation between the mark portion and a rib.

FIG. 10 is a schematic plan view illustrating positional relation between mark portion 50 and rib 34. As shown in FIG. 10, peripheral portion 90 of mark portion 50 includes an outer edge 92 and an inner edge 91. Outer edge 92 is located on an outer side of inner edge 91. Inner edge 91 is a boundary between peripheral portion 90 and central portion 55. When viewed in first direction 101, in peripheral portion 90, rib 34 may be closer toward central portion 55. Specifically, when viewed in first direction 101, inner circumferential surface 37 of rib 34 may be located closer to second center B than outer edge 92 of peripheral portion 90. When viewed in first direction 101, outer circumferential surface 38 of light shield 35 may be superimposed on inner edge 91 of peripheral portion 90. When viewed in first direction 101, outer circumferential surface 38 of light shield 35 may be located closer to second center B than inner edge 91 of peripheral portion 90.

Figure 11:
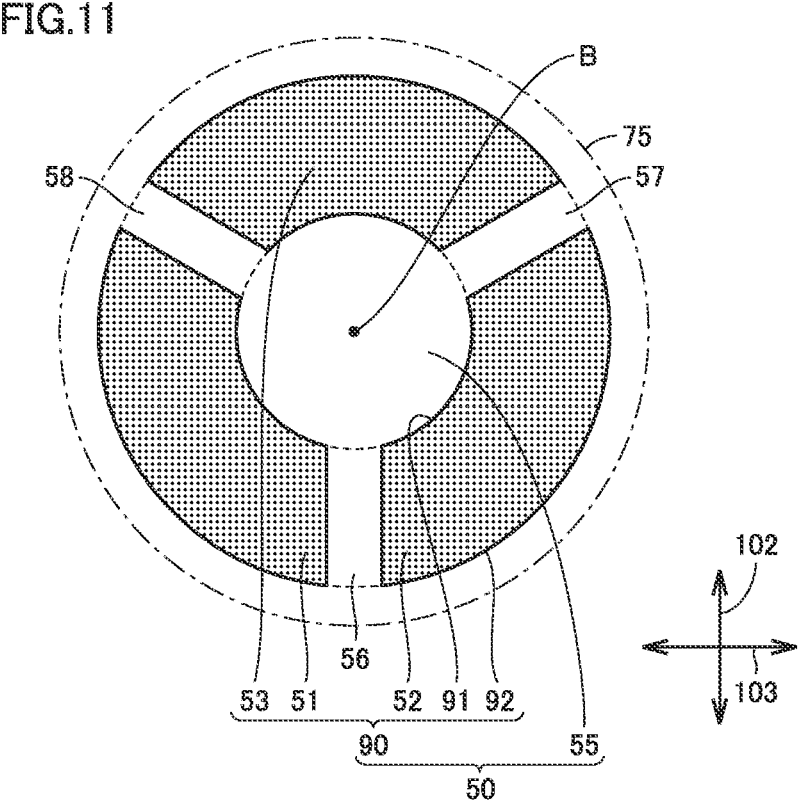
FIG. 11 shows an exemplary illustrative non-limiting schematic plan view illustrating positional relation between the mark portion and a first member.

FIG. 11 is a schematic plan view illustrating positional relation between mark portion 50 and first member 71. As shown in FIG. 11, when viewed in first direction 101, a boundary 75 (see FIG. 3) between first member 71 and second member 72 may surround outer edge 92 of mark portion 50. From a different point of view, when viewed in first direction 101, boundary 75 between first member 71 and second member 72 may be located on the outer side of peripheral portion 90. When viewed in first direction 101, peripheral portion 90 may be located between boundary 75 between first member 71 and second member 72 and central portion 55.

[F. Flexible Printed Circuit]

Figure 12A:
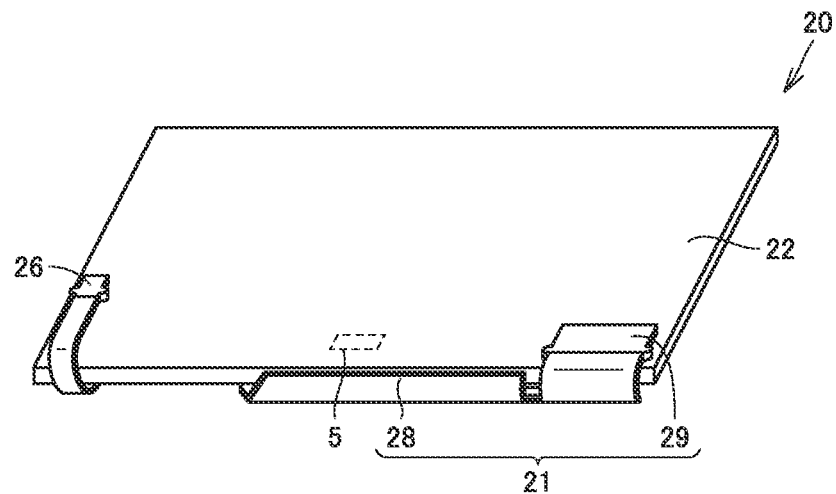
FIG. 12A shows an exemplary illustrative non-limiting schematic perspective view illustrating a construction of the liquid crystal display unit while a flexible printed circuit is folded.
Figure 12B:
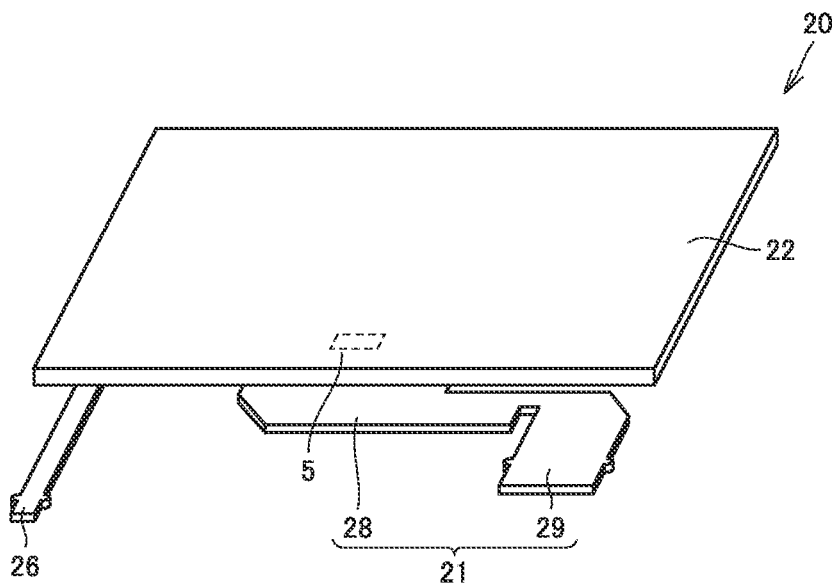
FIG. 12B shows an exemplary illustrative non-limiting schematic perspective view illustrating the construction of the liquid crystal display unit while the flexible printed circuit is not folded.

FIG. 12A is a schematic perspective view illustrating a construction of liquid crystal display unit 20 while a flexible printed circuit is folded. FIG. 12B is a schematic perspective view illustrating the construction of liquid crystal display unit 20 while the flexible printed circuit is not folded. As shown in FIGS. 12A and 12B, liquid crystal display unit 20 may include a first flexible printed circuit 21 and a second flexible printed circuit 26. First flexible printed circuit 21 may electrically be connected to display 23. First flexible printed circuit 21 may be connected to the central position of first side 1 and folded back at a position other than the central position of first side 1. From a different point of view, the first flexible printed circuit may be provided as being folded back not to cut off light from light source 5. First flexible printed circuit 21 may include a first flexible region 28 and a second flexible region 29. First flexible region 28 is arranged lateral to reflector plate 22 so as not to cover reflector plate 22. First flexible region 29 is folded back to cover reflector plate 22 at a position where light from light source 5 is not cut off. In other words, first flexible printed circuit 21 connected to the central position of first side 1 of display 23 extends in third direction 103 to a position where it is not superimposed on light source 5 in second direction 102, and then is folded back.

Second flexible printed circuit 26 may electrically be connected to light source 5. Second flexible printed circuit 26 may be folded back to cover reflector plate 22 at a position where light from light source 5 is not cut off. First flexible region 28 may be arranged between second flexible printed circuit 26 and second flexible region 29.

Figure 13:
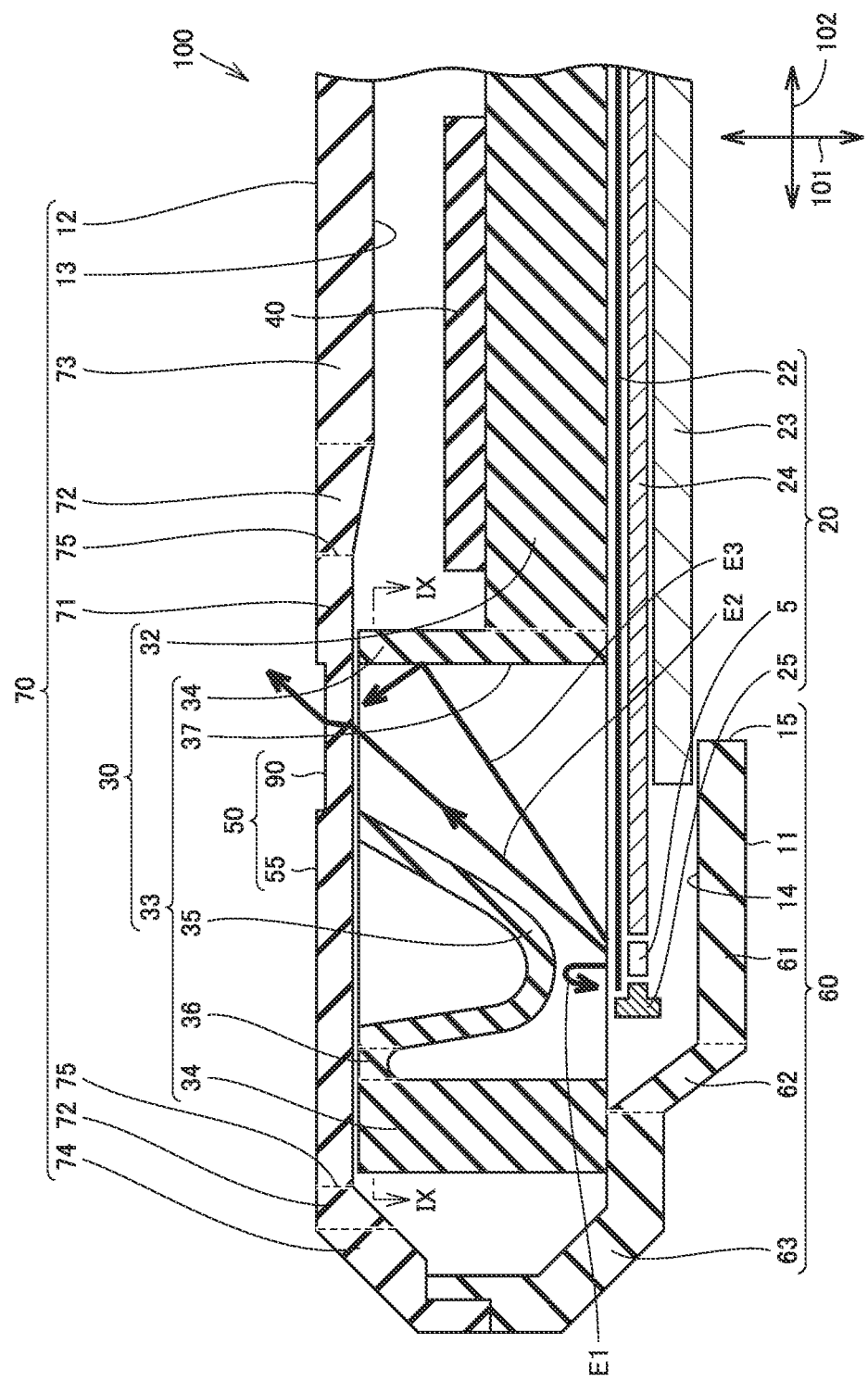
FIG. 13 shows an exemplary illustrative non-limiting schematic cross-sectional view illustrating a direction of diffusion of light from the light source.

FIG. 13 is a schematic cross-sectional view illustrating a direction of diffusion of light from light source 5. As shown in FIG. 13, light shield 35 is arranged on a rear surface side of light source 5. Light shield 35 reflects light from light source 5. For example, light (first light E1) emitted from light source 5 along first direction 101 is reflected at a bottom surface of light shield 35. From a different point of view, first light E1 is suppressed by light shield 35. Light (second light E2) emitted from light source 5 toward peripheral portion 90 is refracted by first member 71 that forms peripheral portion 90 and passes through peripheral portion 90.

In first direction 101, rib 34 is located between rear surface 12 and light source 5. Specifically, rib 34 is located on a front surface side of first member 71. Light (third light E3) emitted from light source 5 toward inner circumferential surface 37 of rib 34 is reflected at inner circumferential surface 37 of rib 34 and diffused toward peripheral portion 90. Rib 34 forms light guide path 39 (see FIG. 9) that guides light from light source 5 to peripheral portion 90. Light (third light E3) reflected at inner circumferential surface 37 of rib 34 passes through peripheral portion 90. Light reflected at inner circumferential surface 37 of rib 34 may be reflected at light shield 35 and guided to peripheral portion 90. In other words, light shield 35 forms light guide path 39 that guides light from light source 5 to peripheral portion 90.

Light that passes through peripheral portion 90 is visually recognized by a user of electronic device 100. When viewed from the user, peripheral portion 90 of mark portion 50 looks shining. Specifically, each of first light transmissive portion 51, second light transmissive portion 52, and third light transmissive portion 53 looks shining.

Though light imperviousness of central portion 55 is enhanced by the construction in which light shield 35 is provided between central portion 55 of mark portion 50 and light source 5 in the above, electronic device 100 according to the present disclosure is not limited to this construction. Specifically, in electronic device 100 according to the present disclosure, central portion 55 may be higher in light imperviousness than peripheral portion 90 without providing light shield 35. For example, central portion 55 may be higher in light imperviousness than peripheral portion 90 by applying a light shield paint to a back surface of central portion 55 and not applying the light shield paint to a back surface of peripheral portion 90. In another aspect, central portion 55 may be higher in light imperviousness than peripheral portion 90 by setting a thickness of central portion 55 to be larger than a thickness of peripheral portion 90.

First Modification

Figure 14:
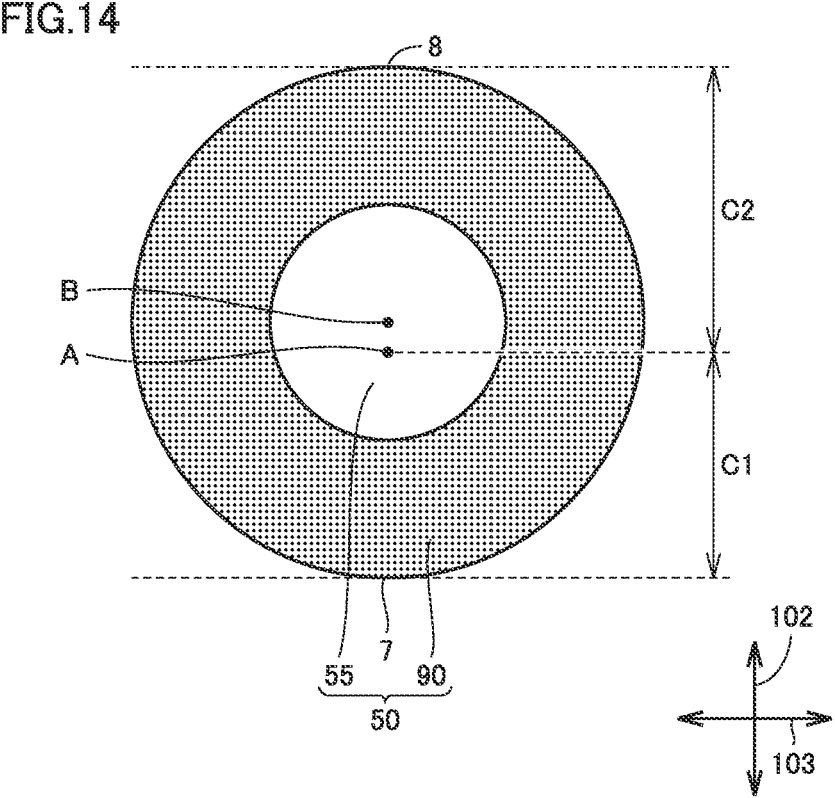
FIG. 14 shows an exemplary illustrative non-limiting schematic plan view illustrating a construction in a first modification of the mark portion.

FIG. 14 is a schematic plan view illustrating a construction in a first modification of mark portion 50. As shown in FIG. 14, mark portion 50 is constituted of central portion 55 and peripheral portion 90. When viewed in first direction 101, peripheral portion 90 may be provided to surround central portion 55. When viewed in first direction 101, central portion 55 may be annular. When viewed in first direction 101, peripheral portion 90 may be in a shape of a doughnut. Peripheral portion 90 may be mirror-finished. Central portion 55 cuts off light from light source 5. Peripheral portion 90 allows passage of light from light source 5 therethrough. When viewed from a user, peripheral portion 90 of mark portion 50 looks shining.

Second Modification

Figure 15:
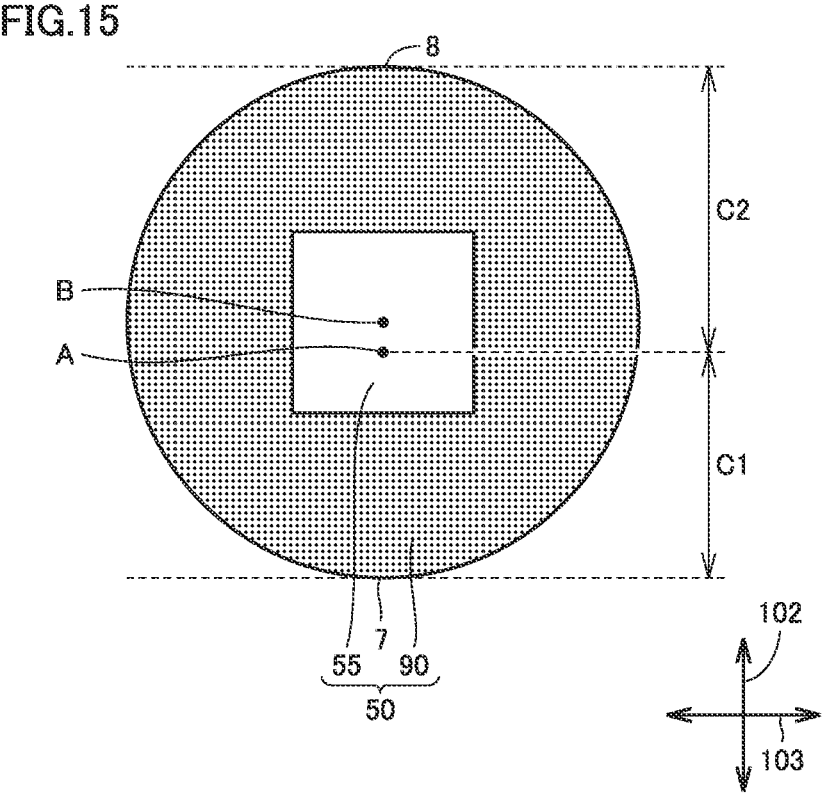
FIG. 15 shows an exemplary illustrative non-limiting schematic plan view illustrating a construction in a second modification of the mark portion.

FIG. 15 is a schematic plan view illustrating a construction in a second modification of mark portion 50. As shown in FIG. 15, when viewed in first direction 101, central portion 55 may be quadrangular. When viewed in first direction 101, central portion 55 may be in a shape of a square or a rectangle. When viewed in first direction 101, peripheral portion 90 may have an outer edge in an annular shape.

Third Modification

Figure 16:
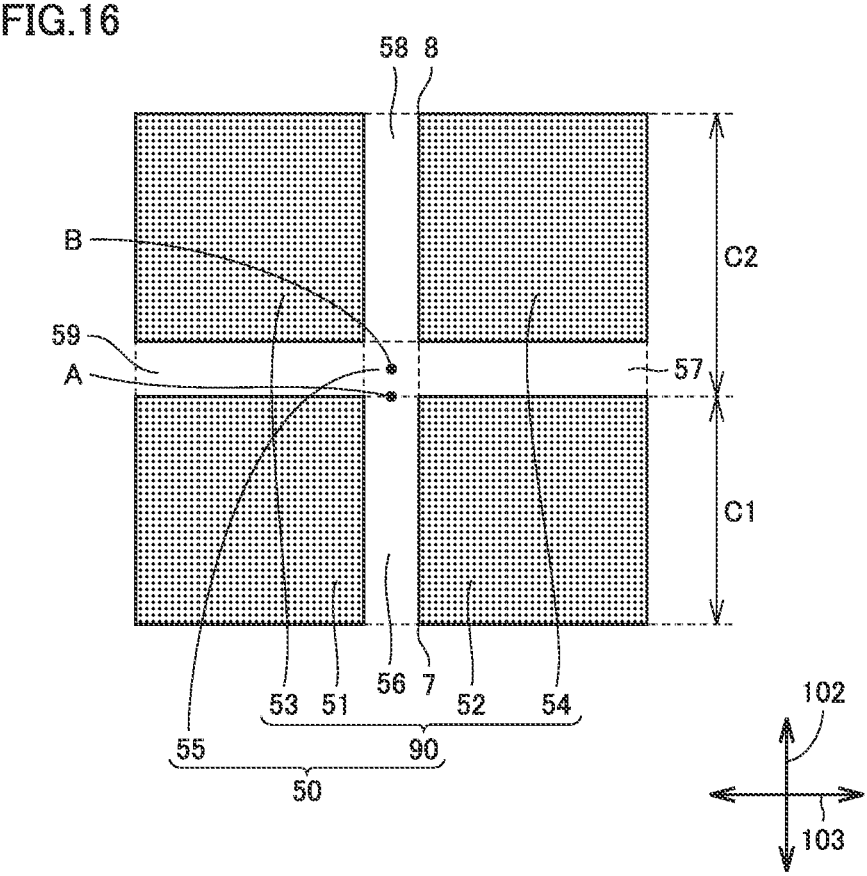
FIG. 16 shows an exemplary illustrative non-limiting schematic plan view illustrating a construction in a third modification of the mark portion.

FIG. 16 is a schematic plan view illustrating a construction in a third modification of mark portion 50. As shown in FIG. 16, when viewed in first direction 101, peripheral portion 90 may include a plurality of light transmissive portions distant from one another. Specifically, peripheral portion 90 includes first light transmissive portion 51, second light transmissive portion 52, third light transmissive portion 53, and a fourth light transmissive portion 54. When viewed in first direction 101, each of the plurality of light transmissive portions is, for example, in a shape of a square. The plurality of light transmissive portions may be provided to surround central portion 55. When viewed in first direction 101, central portion 55 is, for example, in a shape of a square.

In rear surface 12, first light shield region 56, second light shield region 57, third light shield region 58, and a fourth light shield region 59 may be formed. First light shield region 56 is located between first light transmissive portion 51 and second light transmissive portion 52. Second light shield region 57 is located between second light transmissive portion 52 and fourth light transmissive portion 54. Third light shield region 58 is located between third light transmissive portion 53 and fourth light transmissive portion 54. Fourth light shield region 59 is located between first light transmissive portion 51 and third light transmissive portion 53. Each of first light shield region 56, second light shield region 57, third light shield region 58, and fourth light shield region 59 is contiguous to central portion 55. When viewed in first direction 101, each of first light shield region 56, second light shield region 57, third light shield region 58, and fourth light shield region 59 is, for example, in a rectangular shape.

Electronic device 100 is, for example, a game console. Electronic device 100 may further include a storage (not shown) and/or a processor (not shown). For example, a dynamic random access memory (DRAM) is adopted as the storage. An application program such as a game may be stored in the storage. The processor may read the application program and perform information processing. Display 23 may show, for example, an image generated as a result of information processing performed by the processor. Electronic device 100 may be, for example, an information processing apparatus other than the game console.

Electronic device 100 does not have to include light shield 35. Mark portion 50 does not have to be divided into central portion 55 and peripheral portion 90. The entire mark portion 50 may shine as light from light source 5 passes therethrough. Light source 5 may be located "on the right of" or "on the left of" or "above" display 23 in the present embodiment. In this case, a side where light source 5 is located may be understood as a "lower" side of display 23.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An electronic device comprising:
   a housing including a front surface and a rear surface opposite to the front surface;
   a display provided on a side of the front surface of the housing, the display including a first side on a lower side and a second side on an upper side;
   a light source provided inside the housing and on the lower side;
   a light guide plate provided between the display and the rear surface, the light guide plate illuminating the display by guiding light from the light source to the upper side from the lower side of the display; and
   a mark portion provided in the rear surface of the housing, the mark portion including a portion that shines as light from the light source passes, wherein
   with a lower end of the mark portion being defined as a first end and with an upper end of the mark portion being defined as a second end, when viewed in a direction from the rear surface toward the front surface, the light source is located between the first end and the second end and a distance from the second end to the light source is longer than a distance from the first end to the light source.

2. The electronic device according to claim 1, further comprising:
   a reflector plate located between each of the light source and the light guide plate and the rear surface; and
   a light shield located between the reflector plate and the mark portion, the light shield cutting off light from the light source.

3. The electronic device according to claim 1, further comprising a light shield located between the light source and the rear surface when viewed in the direction from the rear surface toward the front surface, the light shield cutting off light from the light source, wherein
   the mark portion includes a central portion and a peripheral portion that is provided around the central portion and shines as light from the light source passes, and
   the light shield is provided between the central portion and the light source and not provided between the peripheral portion and the light source.

4. The electronic device according to claim 3, wherein the light shield is constructed to reflect light from the light source and to guide light to the peripheral portion.

5. The electronic device according to claim 4, wherein the light shield protrudes toward the light source, and
   a distance between the light source and the light shield at a position of the light source in the direction from the rear surface toward the front surface is shorter than a distance between the light source and the light shield at a position of a boundary between the central portion and the peripheral portion.

6. The electronic device according to claim 4, wherein as the light shield is closer to the light source in a direction from the first side toward the second side, the light shield protrudes toward the light source.

7. The electronic device according to claim 3, wherein the light shield is higher in reflectance than the housing.

8. The electronic device according to claim 3, wherein the peripheral portion includes a plurality of light transmissive portions distant from one another, and
   when viewed in the direction from the rear surface toward the front surface, the plurality of light transmissive portions are provided such that the central portion lies among the light transmissive portions or the central portion is surrounded by the light transmissive portions.

9. The electronic device according to claim 3, wherein when viewed in the direction from the rear surface toward the front surface, the peripheral portion is provided to surround the central portion.

10. The electronic device according to claim 3, wherein when viewed in the direction from the rear surface toward the front surface, the light source is provided on a perpendicular bisector of the first side, and
    when viewed in the direction from the rear surface toward the front surface, the mark portion is in a shape in line symmetry with respect to the perpendicular bisector.

11. The electronic device according to claim 3, further comprising a rib that is provided around the light shield and guides light from the light source to the peripheral portion.

12. The electronic device according to claim 11, comprising a battery holder where a battery is accommodated, the battery holder being provided between the rear surface and the light guide plate, wherein the rib is provided in a portion of the battery holder different from a portion where the battery is arranged, and the rib and the portion where the battery is arranged are provided on an identical surface of the battery holder.

13. The electronic device according to claim 11, wherein when viewed in the direction from the rear surface toward the front surface, in the peripheral portion, the rib is closer to the central portion.

14. The electronic device according to claim 1, wherein the mark portion includes a central portion and a peripheral portion that is provided around the central portion and shines as light from the light source passes, and the central portion is higher in light imperviousness than the peripheral portion.

15. The electronic device according to claim 1, wherein the housing includes a rear housing portion that defines the rear surface, the rear housing portion includes a first member that defines the mark portion and a second member contiguous to the first member and increasing in thickness as a distance from the first member increases, at least a part including an outer edge of the mark portion is mirror-finished, and when viewed in the direction from the rear surface toward the front surface, a boundary between the first member and the second member surrounds an outer edge of the mirror-finished mark portion.

16. The electronic device according to claim 1, comprising a flexible printed circuit electrically connected to the display, wherein the flexible printed circuit is connected to a central position of the first side and folded back at a position other than the central position of the first side.

* * * * *